United States Patent [19]
Gaier

[11] Patent Number: 5,645,877
[45] Date of Patent: Jul. 8, 1997

[54] FERMENTED FOOD PRODUCT AND PREPARATION THEREOF

[75] Inventor: Walter Gaier, Le Mont Pelerin, Switzerland

[73] Assignee: Nestec S.A., Vevey, Switzerland

[21] Appl. No.: 458,299

[22] Filed: Jun. 2, 1995

[30] Foreign Application Priority Data

Jun. 29, 1994 [EP] European Pat. Off. .............. 94110063

[51] Int. Cl.$^6$ .................... A23B 4/22; A23C 9/123; A23K 1/10; A23J 1/00
[52] U.S. Cl. ................. 426/56; 426/55; 426/58; 426/59; 426/34; 426/41; 426/43
[58] Field of Search ................... 426/56, 59, 34, 426/43, 55, 58, 41

[56] References Cited

U.S. PATENT DOCUMENTS

| | | |
|---|---|---|
| 3,115,409 | 12/1963 | Hallinan et al. . |
| 3,891,771 | 6/1975 | Green et al. . |
| 4,397,878 | 8/1983 | Koide et al. ............... 426/40 |
| 4,569,846 | 2/1986 | Ohzeki et al. ............... 426/43 |
| 4,873,094 | 10/1989 | Pischke et al. ............... 426/43 |
| 4,929,445 | 5/1990 | Vandenbergh et al. ............... 426/38 |
| 5,037,660 | 8/1991 | Driessen et al. ............... 426/43 |
| 5,162,506 | 11/1992 | Hadden ............... 530/412 |
| 5,192,565 | 3/1993 | Buhler et al. . |
| 5,382,438 | 1/1995 | Hottinger et al. ............... 426/43 |

FOREIGN PATENT DOCUMENTS

| | | |
|---|---|---|
| 0241097 | 4/1987 | European Pat. Off. . |
| 0303477 | 2/1989 | European Pat. Off. . |
| 0346909 | 12/1989 | European Pat. Off. . |
| 2314671 | 1/1977 | France . |
| 1549196 | 3/1979 | United Kingdom . |
| WO8800439 | 1/1988 | WIPO . |

OTHER PUBLICATIONS

WPI Data Base Derwent Abstract Accession NO. 86–154984 of Chirkina, et al., Swiss Patent Document No. SU 1194371 Nov. (1985).

*Primary Examiner*—Carolyn Paden
*Assistant Examiner*—Choon P. Koh
*Attorney, Agent, or Firm*—Vogt & O'Donnell, LLP

[57] ABSTRACT

Process for the preparation of a fermented food product for animals, in which a finely divided and emulsified mixture comprising a collagenic material, a protein material and milk is pasteurized while homogenizing constantly, and then it is fermented by lactic acid bacteria. The invention also relates to the product derived from the process.

16 Claims, No Drawings

FERMENTED FOOD PRODUCT AND PREPARATION THEREOF

BACKGROUND OF THE INVENTION

The subject of the present invention is a process for the preparation of a fermented food product for animals, as well as the product derived from the process.

It is known that an emulsified mixture of meat which is finely divided, for example by grinding, tends to separate and to produce a lipid phase, an aqueous phase and protein sediments. Accordingly, in order to traditionally manufacture meat pâtés, one or more additives are added to a meat emulsion, for example phosphates or blood plasma proteins so as to stabilize and homogenize this emulsion.

On the other hand, French Patent Application Publication No. 2,314,671 describes a process in which a pasteurized mixture comprising powdered milk, cooked pieces of meat and a gelling agent, for example gelatin, is fermented by lactic acid bacteria so as to stabilize the gel during storage and to make it microbiologically stable.

SUMMARY OF THE INVENTION

The aim of the present invention is to provide a process for the preparation of a new emulsified, pasteurized and fermented product based on meat or fish which makes it possible not to use both an additive to stabilize the emulsion and a gelling agent to thicken it.

To this end, in the process for the preparation of a fermented food product for animals according to the present invention, a finely divided and emulsified mixture comprising at least one collagenic material, one protein material and milk is pasteurized, while homogenizing constantly, and then it is fermented by lactic acid bacteria.

Preferably, the finely divided and emulsified mixture comprises at least 1–35% of a collagenic material, 10–50% of a protein material and milk up to a total water content of 50–95%.

Furthermore, the product derived from the process according to the present invention is also the subject of the invention.

The process which is the subject of the invention thus has the advantage that no additive is used to stabilize the emulsified mixture, nor gelling agents to thicken it. Indeed, this emulsion is constantly maintained, thereby making it possible to stabilize it and therefore to avoid a separation of its constituents. Furthermore, collagen is extracted from collagenic materials during the pasteurization, which helps to thicken the emulsified mixture and also to stabilize it during the fermentation. Finally, this fermentation followed by the cooling of the mixture to storage temperatures of 4° to 25° C. for example, also allows lasting stabilization of the emulsified mixture which then presents no separation of its constituents.

Likewise, the texture of the fermented product according to the present invention has the advantage of being particularly fine and aerated, by virtue of the combined action of the constant homogenization of the mixture and of its fermentation by lactic acid bacteria. In addition, the taste of the product is different from that of traditional products based on meat or fish such as pâté type products, for example. The product according to the present invention is thus particularly attractive for pets, for example dogs or cats, and can be even more so if it is combined with solid products conventionally used in animal nutrition, for example pieces of meat or fish, and/or extruded cereals and/or extruded proteins, for example.

In addition, the product according to the present invention has the advantage of being stable in its taste, its texture and its microbiological qualities, for at least 3 months under conventional conditions for the preservation of pasteurized and packaged food products, at temperatures of the order of 4° to 25° C., for example.

Finally, this product can be made with raw materials which are not very expensive or which are conventionally intended to be thrown away.

DETAILED DESCRIPTION OF THE INVENTION

In this description, "protein material" is understood to mean any normally insoluble, solid, edible protein tissue, especially traditional meats, including fish or poultry, offals, or other sources of animal proteins, for example.

Likewise, "collagenic material" is understood to mean any solid tissue comprising mainly collagen, especially bone, rinds, cartilage, tendon, fish bones, for example.

In addition, "milk solids" is also understood to mean powdered milk and/or purified and dried milk compounds, especially powdered whey or a powdered whey permeate, for example.

Finally, the expression "total water content" means the quantity of water contained in all the constituents of the mixture, which can therefore be from milk, meat and bones, for example.

In order to implement the present process, a finely divided and emulsified mixture comprising milk, a collagenic material and a protein material is therefore first prepared.

These collagenic and protein materials may be either distinct, for example liver and/or meat for the proteins, and bones and/or cartilage for the collagenic material, or contained in the same mass, for example an animal carcase, or the neck and/or the gizzard of a chicken which comprise, blended, bones, cartilage, tendons, rinds and meat, for example.

It is thus preferred to grind first the collagenic and protein materials, which may therefore be distinct or blended, then to add a quantity of whole or skimmed milk up to a desired total water content, and then to stir the whole sufficiently to emulsify the mixture. Finally, this finely divided emulsion may comprise, after grinding, pieces of material of a size of less than 1 mm, for example, and at least 1–35% of a collagenic material, 10–50% of a protein material and milk up to a total water content of 50–95%, for example.

It is also possible to replace the whole or skimmed milk in the mixture with 1–10% of powdered milk solids and water up to a total water content of 50–95%. Preferably, powdered milk and/or powdered whey and/or a powdered whey permeate is thus preferably used, for example.

Likewise, the collagenic and protein materials may have been previously pasteurized, sterilized or frozen before being ground to prepare the emulsified mixture, as may be required by current food legislation or alternatively demanded in order to achieve desirable microbiological safety standards. Antimycotic agents, colourings, sugars, salts, vitamins, antioxidants, preservatives, spices, flavourings and other adjuvants, may also be added to the divided and emulsified mixture, for example.

In a second instance, in order to implement the present process, this emulsion is pasteurized under conventional pasteurization conditions, especially by heating at 70°–100° C. for 1 to 60 min, for example. It is also important to constantly homogenize this emulsion so as to avoid a separation of its different constituents and also to enhance the extraction of collagen from the collagenic materials. For that, it is preferable to homogenize the mixture by a device equipped with rapidly rotating cutting blades.

Finally, in a third instance, the pasteurized mixture is fermented by lactic acid bacteria. It is however also possible to add to the lactic acid bacteria microorganisms normally used to ferment meat products, such as *Staphylococcus carnosus* or *Micrococcus varians*, for example.

It is thus possible to inoculate the pasteurized mixture with a fresh preculture of each microorganism used and/or with a fresh preculture comprising a mixture of the microorganisms used. The preculture medium may be, moreover, a synthetic nutrient medium normally used for the laboratory culture of these microorganisms. All the possibilities for inoculation with one or more fresh precultures, each comprising one or more strains of microorganisms which may be of a genus or of a species that is different, are therefore envisaged. The inoculum of each fresh preculture is furthermore added in a quantity which depends on the duration required for the fermentation to reach the final pH, and on the strain(s) of microorganisms used. Preferably, the pasteurized mixture is thus inoculated at the rate of $10^6$ to $10^7$ cfu/g (cfu is the abbreviation for colony forming units).

For lactic acid bacteria, the preculture medium is preferably a milk-based medium such as the MSK medium comprising 10% reconstituted powdered skimmed milk and $1/10,000$ parts of a commercial yeast extract, for example. It is thus possible to prepare this fresh preculture by performing several successive precultures of initially frozen or freeze-dried strains, and then to inoculate the pasteurized mixture with the last preculture, generally the third, taken from the preculture medium coagulation stage.

Finally, it is also possible to inoculate the mixture directly with a quantity of freeze-dried or frozen microorganisms which depends on the duration required for the fermentation to reach a desired pH and on the strain(s) of microorganisms used.

The lactic acid bacteria may be chosen, alone or in combination, from the group consisting of streptococci, lactococci, lactobacilli and pediococci, especially *Lactococcus lactis subsp. lactis, Lactococcus lactis subsp. cremoris, Lactococcus lactis subsp. lactis biovar diacetylactis, Streptococcus thermophilus, Lactobacillus acidophilus, Lactobacillus helveticus, Lactobacillus delbrueckii*, especially *Lactobacillus delbrueckii subsp. bulgaricus, Lactobacillus casei subsp. casei, Lactobacillus plantarum, Lactobacillus fermentum, Pediococcus pentasaceus, Pediococcus acidilactici, Lactobacillus sake, Lactobacillus curvatus*, for example (Bergey's Manual of Systematic Bacteriology, Vol. 1, 1984; Vol. 2, 1986). It should be noted that some of these microorganisms are mesophilic and can therefore ferment the mixture at temperatures of between 20° and 45° C., for example.

Finally, it is also possible to use one of the *Lactobacillus delbrueckii subsp. bulgaricus* lac(−) strains described in EP 0,518,096 which have a deletion in the β-gal gene, so as to reduce the post-acidification of the mixture after fermentation. For that, a minimum quantity of glucose can be added to the mixture before fermentation, for example 0.1–2%, so as to stop the fermentation after depletion of the glucose. It is also possible to ferment one of these lac(−) strains in combination with a commercial Streptococcus thermophilus strain so as to also reduce the post-acidification of the product.

In order to implement the present process, the mixture can be cooled before adding the inoculum of lactic acid bacteria to it and it can also be constantly homogenized during this cooling period. It is thus possible to pasteurize the mixture at 80°–90° C. for 1–20 min, to cool it while homogenizing it constantly, and then to ferment it by lactic acid bacteria at 20°–45° C. up to a pH of 4–4.5, for example.

Likewise, it is possible to add to the divided and emulsified mixture and/or to the pasteurized mixture and/or to the fermented mixture pieces chosen, alone or in combination, from the group consisting of meat, fish, extruded proteins, extruded cereals, for example. These pieces can moreover be previously pasteurized, and have a size which does not exceed 5 cm³, for example.

Finally, the mixture can be packaged in plastic containers before leaving it to ferment up to the desired pH. The sealed container can thus be preserved after fermentation for at least 3 months at room temperature, that is to say up to 25° C., without the preserved product losing its texture and taste qualities as a result. The filled containers can also be again pasteurized if a preservation of more than 6 months is desired.

In a first specific embodiment of the present process, to obtain a pourable product according to the present invention, that is to say a product capable of flowing in spite of its viscous consistency, it is possible to use in the present process a finely divided and emulsified mixture, comprising at least 1–10% of a collagenic material, 10–25% of a protein material, and milk or 1–10% of powdered milk solids and water, up to a total water content of 75–95%.

It is thus found that the product prepared in this specific manner can be poured in spite of its viscous consistency, and has a fresh meat or fish flavour which is attractive for pets. This product can be used as a drink for these animals.

In a second specific embodiment of the present process, to obtain a product according to the present invention having the traditional appearance of a meat or fish pâté a finely divided and emulsified mixture comprising at least 10–35% of a collagenic material, 20–50% of a protein material, milk or 1–10% of powdered milk solids and water, up to a total water content of 60–85%, is used in the present process.

It is thus found that the product prepared in this specific manner has a fresh meat or fish pâté appearance which is particularly attractive for pets, and this all the more so if these products comprise pieces of meat or of fish and/or of extruded cereals and/or of extruded proteins.

Preferably, these extruded proteins and cereals are coated with a hydrophobic adjuvant so that they do not soften and that they preserve a crunchy character during the period of preservation of the product. These adjuvants can thus all be known fats or oils such as for example hydrogenated palm oil, or alternatively waxes such as for example beeswax.

EXAMPLES

The process according to the present invention is described in greater detail in the examples presented below by way of illustration. The percentages are given therein by weight.

Example 1

A fermented and pourable meat-based product is prepared as a drink for pets. This product comprises the following ingredients:

10% pork liver

5% chicken breast

5% chicken gizzard 0.8% powdered milk 0.8% powdered whey permeate 78.4% water

The chicken mixture is thus finely ground in a conventional grinder (Stephan, Germany), the liver is added to the latter and then the rest of the ingredients are added to it. The emulsified and divided mixture finally comprises particles of material having a size of less than 1 mm, and about 18% of protein material (meat, liver), 2% of collagenic material, 1.6% of milk solids and a total water content of 85%.

Then the mixture is heated in the grinder at 85° C. for 13 min, while constantly homogenizing the latter. In fact, the temperature of the mixture reaches 85° C. at the end of 8 min of heating. Then, it is cooled down to 42° C. while homogenizing constantly.

Finally, this last mixture is inoculated at the rate of 0.1% of two fresh precultures in an MSK medium comprising a *Lactobacillus delbruekii subsp. bulgaricus* strain and a *Streptococcus thermophilus* strain, respectively, which are traditionally used for the preparation of yogurt. The whole is then homogenized for 1 min, the mixture is poured into plastic containers which are sealed, and then they are incubated at 40° C. until the pH of the mixture reaches about 4.5. These containers are then cooled down to 12° C. to stop the fermentation.

A portion of the containers are then preserved at 20° C. for 1 week, another portion for 1 month and the rest for 3 months. Each product has, at the end of these periods, the same flavour and the same texture. Furthermore, the pH of the product preserved for 3 months is about 4.1. Finally, dogs and cats accept lapping this thick drink without difficulty.

Example 2

The same drink as that described in Example 1 is prepared, with the difference that the mixture is fermented up to a pH of about 4.5 by 0.1% of a fresh culture in an MSK medium comprising, as a mixture, 75% of a commercial *Streptococcus thermophilus* strain and 25% of the strain *Lactobacillus bulgaricus* CNCM I-1067 described in EP 0,518,096.

The product, preserved for 3 months at 20° C., has the same properties as those described for the preserved products of Example 1, but a substantially less acidic pH, of the order of 4.35.

Example 3

A drink for pets based on skimmed milk is prepared. The ingredients are the following:

10% pork liver

5% chicken breast

5% chicken gizzard

80% skimmed milk

The emulsion, the pasteurization and the fermentation are performed in the same manner as that described in Example 1, and with the same bacterial strains. The drink is then preserved at 20° C. for 3 months. The taste and texture of the product after preservation are similar to those of the preserved products described in Examples 1 and 2.

Example 4

A meat-based fermented product having the appearance and the texture of a traditional meat pâté is prepared. This product comprises the following ingredients:

20% pork liver

40% of a chicken mixture (33% of legs and feet, 25% of breast, 16.5% of carcase, 16.5% of gizzard and 9% of neck)

0.8% powdered milk 0.8% powdered whey permeate

40% water

The chicken mixture is thus finely minced with half the water which is in the form of ice cubes so as to cool the "meat-mincing" device. The whole is then transferred to a grinder; the liver is then added to it and then the rest of the ingredients. The emulsified mixture finally comprises particles of material having a size of less than 1 mm, and about 40% of protein material (meat, liver), 20% of collagenic material (bone, cartilage, tendons), 1.6% of milk solids and a total water content of 75%.

The mixture is heated, cooled and fermented in the same manner as that described in Example 1, and with the same bacterial strains.

A portion of the containers is finally preserved at 20° C. for 1 week, another portion for 1 month, and the rest for 3 months. Each pâté has, at the end of these periods, the same flavour and the same texture. Furthermore, the pH of the product preserved for 3 months is about 4.15. Finally, dogs and cats accept eating these meat pâté s particularly well.

Example 5

The same pâté as that described in Example 4 is prepared, the only difference being that 0.3% glucose is added to the pasteurized mixture, and that the mixture is fermented until the glucose is depleted, that is to say up to a pH of about 4.5, with 0.1% of a fresh preculture comprising the strain *Lactobacillus delbrueckii subsp. bulgaricus* CNCM I-1067 described in EP 0,518,096.

The product preserved for 3 months at 20° C. has the same properties as those described for the preserved products of Example 4, but has nevertheless a substantially less acidic pH of the order of 4.45.

Example 6

A meat pâté for pets based on skimmed milk is prepared. The ingredients are the following:

20% pork liver

60% of the chicken mixture described in Example 4

20% skimmed milk

The emulsion, the pasteurization and the fermentation are performed as described in Example 4, and with the same bacterial strains. The pâté is then preserved in a packaging for 3 months. The taste and the texture of the product after preservation are similar to those of the product described in Examples 4 and 5.

Example 7

The same meat pâté as that described in Example 4 is prepared, the only difference being that cooked meat pieces having an average size of about 2 cm$^3$ are added to the pasteurized mixture before fermentation.

Example 8

The same meat pâté as that described in Example 4 is prepared, the only difference being that protein pieces which are extruded, pasteurized and coated with beeswax are added to the pasteurized mixture, at the end of the fermentation and during the cooling, and that the mixture is only then poured into containers which are sealed. These protein pieces, which are traditionally used in animal nutrition, preserve in this case their crunchy character for at least 3 months in the packaging and at a temperature of 20° C.

Example 9

A fish pâté is prepared in the same manner as that described in Example 4, and with the same bacterial strains. This pâté comprises, in this case, 20% of fish offals, 30% of heads, 10% of tails, 0.8% of powdered milk, 0.8% of powdered whey permeate, and 40% of water.

Example 10

The same meat pâté as that described in Example 4 is prepared, the only difference being that the pasteurized mixture, comprising in addition 300 ppm of nitrite salts, is directly inoculated with two freeze-dried starters comprising a commercial strain of *Lactobacillus sake* and a commercial strain of *Staphylococcus carnosus* respectively, and that the mixture is fermented at 30° C. up to a pH of about 4.5.

The texture of the product is similar to that of the product of Example 4. The taste is however somewhat different, but particularly attractive for dogs or cats. Finally, the colour of the product is classically red, due to the action of *Staphylococcus carnosus*.

Example 11

The same meat pâté as that described in Example 4 is prepared, the only difference being that the pasteurized mixture, comprising in addition 300 ppm of nitrite salts, is inoculated with two freeze-dried starters comprising a commercial strain of *Lactococcus lactis* and a commercial strain of *Micrococcus varians* respectively, and that the mixture is fermented at 30° C. up to a pH of about 4.5.

The texture and the taste of the product are similar to those of the product of Example 10. Finally, the colour of the product is classically red, due to the action of *Micrococcus varians*.

I claim:

1. A process for preparing a fermented food product comprising:
    preparing an emulsified composition comprising, in admixture, a milk and dispersed particles of a protein material and a collagenic material;
    simultaneously homogenizing and pasteurizing the emulsified composition so that collagen is extracted from the collagenic material for thickening and stabilizing the emulsified composition for obtaining an emulsified and pasteurized composition;
    inoculating the emulsified and pasteurized composition with at least one strain of lactic acid bacteria; and
    incubating the inoculated composition to obtain a fermented feed product.

2. A process according to claim 1 wherein the particles of the emulsified composition have a size of less than 1 mm.

3. A process according to claim 1 wherein the emulsified composition and the fermented food product are not prepared with added gelling and stabilizing agents.

4. A process according to claim 1 wherein the emulsified composition is simultaneously pasteurized and homogenized at a temperature of from 80° to 90° C.. for from 1 minute to 20 minutes.

5. A process according to claim 4 wherein the inoculated composition is incubated at a temperature of from 20° to 45° C. and for a time sufficient to provide the fermented product with a pH of from 4 to 4.5.

6. A process according to claim 4 further comprising cooling the emulsified and pasteurized composition before inoculating with the strain of lactic acid bacteria.

7. A process according to claim 6 further comprising homogenizing the emulsified and pasteurized composition during cooling.

8. A process according to claim 1 wherein the emulsified composition comprises from 1% to 35% by weight collagenic material, from 10% to 50% by weight protein material and has a total water content of from 50% to 95% by weight.

9. A process according to claim 1 wherein the emulsified composition comprises from 10% to 35% by weight collagenic material, from 20% to 50% by weight protein material and has a total water content of from 60% to 85% by weight.

10. A process according to claim 1 wherein the emulsified composition comprises from 1% to 10% by weight collagenic material, from 10% to 25% by weight protein material and has a total water content of from 75% to 95% by weight.

11. A process according to claim 1 wherein the strain of lactic acid bacteria is selected from the group consisting of streptococci, lactobacilli, lactococci and pediococci.

12. A process according to claim 1 wherein the strain of lactic acid bacteria is a strain of *Lactobacillus bulgaricus* having a deletion in the β-gal gene.

13. A process according to claim 1 further comprising inoculating and incubating the emulsified and pasteurized composition with at least one strain of a meat-fermenting microorganism.

14. A process according to claim 1 further comprising adding to the emulsified and pasteurized product, or to the fermented product, pieces selected from the group consisting of meat, fish, extruded protein and extruded cereal.

15. A process according to claim 1 wherein the milk for preparing the emulsified composition is selected from the group consisting of whole milk and skim milk.

16. A process according to claim 1 wherein the milk for preparing the emulsified composition is selected from the group consisting of powdered milk, powdered whey and powdered whey permeate.

* * * * *

UNITED STATES PATENT AND TRADEMARK OFFICE
CERTIFICATE OF CORRECTION

PATENT NO. : 5,645,877
DATED : July 8, 1997
INVENTOR(S) : Walter GAIER

It is certified that error appears in the above-indentified patent and that said Letters Patent is hereby corrected as shown below:

On the title page, second column, section [57], delete the substantive disclosure of the ABSTRACT and insert therefor:

-- A fermented food product is made by preparing an emulsified composition containing a milk and dispersed particles of a protein material and a collagenic material. The emulsified composition is simultaneously homogenized and pasteurized and then inoculated and incubated with at least one strain of lactic acid bacteria to obtain a fermented product. --

Signed and Sealed this

Twenty-eighth Day of October, 1997

*Attest:*

BRUCE LEHMAN

*Attesting Officer*     *Commissioner of Patents and Trademarks*